Figure 1:
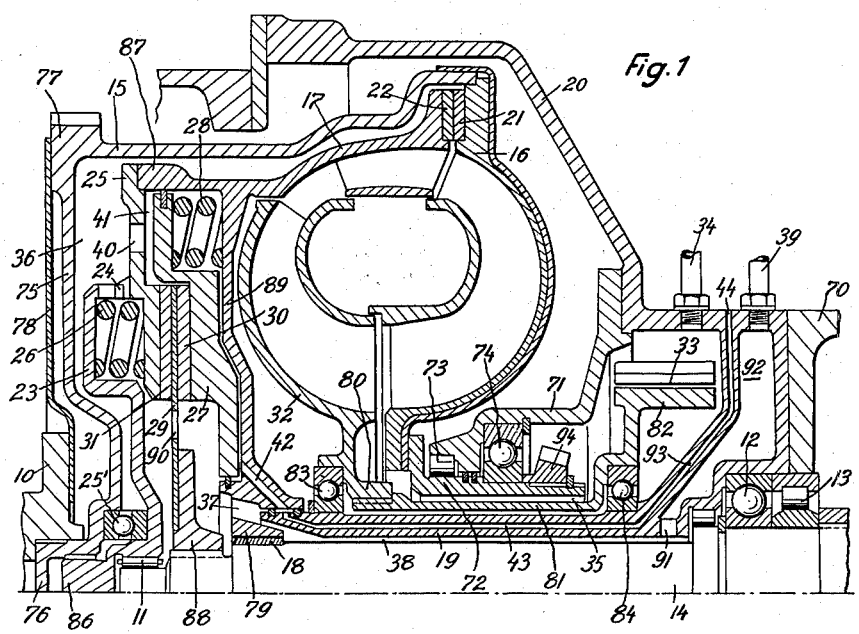

Inventors
EUGEN STUMP AND
PAUL E. STRIFLER
BY Dicke and Craig
ATTORNEYS

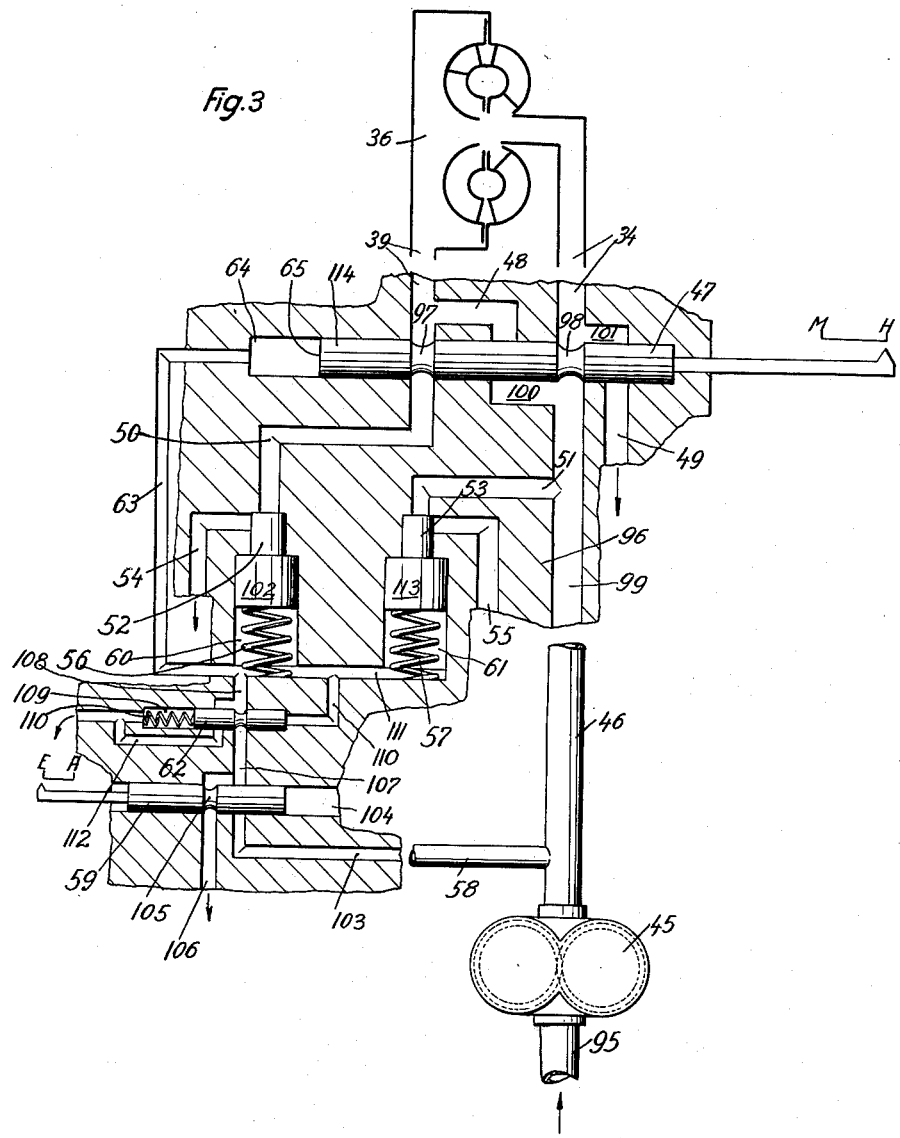

United States Patent Office 2,992,713
Patented July 18, 1961

2,992,713
HYDRO-DYNAMIC TRANSMISSION
Eugen Stump, Stuttgart-Unterturkheim, and Paul E. Strifler, Kornwestheim, Germany, assignors to Daimler-Benz Aktiengesellschaft, Stuttgart-Unterturkheim, Germany
Filed Feb. 1, 1957, Ser. No. 637,813
Claims priority, application Germany Feb. 3, 1956
19 Claims. (Cl. 192—3.2)

Our invention relates to a hydro-dynamic transmission connecting a driving shaft with a driven shaft and, more particularly, to a transmission of the type in which the driving shaft is connected with an impeller rotor and the driven shaft is connected with a turbine rotor, both rotors cooperating to confine a circulation chamber, the driven shaft being connected with a mechanical transmission adapted to be set to any one of a plurality of ratios of transmissions, a disengageable friction clutch being provided for directly connecting the driving shaft with the driven shaft.

It is the primary object of our invention to provide improved means for shifting the transmission from the hydro-dynamic operation to the mechanical operation and vice versa without requiring an additional fluid circulation for such purpose, such means being capable of operation with the aid of the pressure fluid spaces and elements present in the transmission.

Further objects of our invention are to provide a transmission of the type indicated which is simple and compact and reliable in operation; to provide means for utilizing the main fluid circulation of the hydro-dynamic device for the purpose of operating the disengageable friction clutch; to provide control means for disengaging said clutch whenever the speed ratio of the mechanical transmission is changed; and to provide means ensuring a smooth actuation of the disengageable friction clutch by the fluid pressure prevailing in the hydro-dynamic device.

Further objects of our invention will appear from the detailed description of two preferred embodiments following hereinafter with reference to the drawings, the features of novelty for which patent protection is sought being set forth in the appended claims. It is to be understood, however, that our invention is in no way limited to the details of the embodiments described hereinafter and that the terms and phrases used in such detailed description have been chosen for the purpose of explanation rather than that of restricting or limitation.

Figure 2:
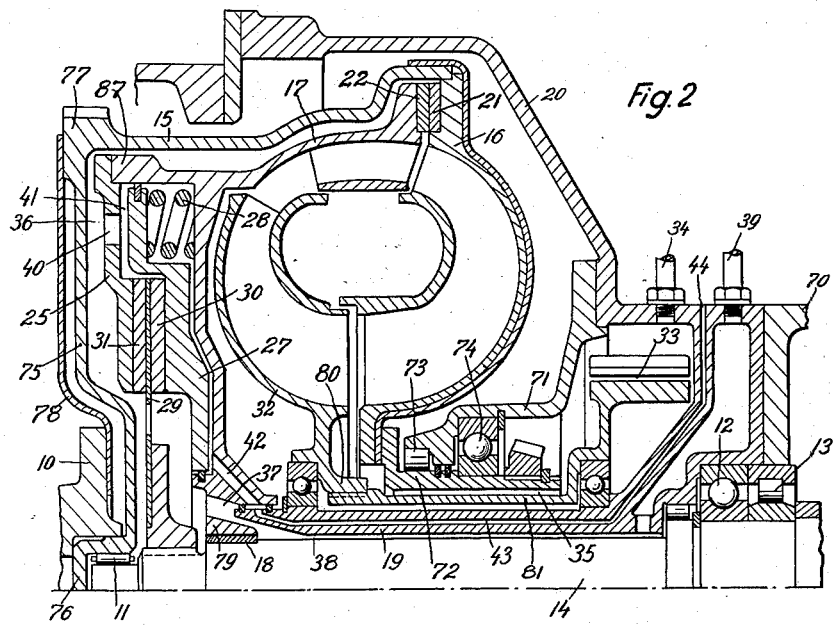

In the drawings:

FIG. 1 is a partial longitudinal section taken through our improved transmission in which the axially movable turbine rotor is urged by springs into engagement with the impeller, FIG. 2 is a partial longitudinal section of a modified transmission in which the axially movable turbine rotor is urged into engagement with the impeller rotor by fluid pressure only, FIG. 3 is a more or less diagrammatic representation of the hydraulic circuit of the transmissions shown in FIGS. 1 and 2.

The driving shaft which may be the crank shaft of an engine terminates in a flange 10. The driven shaft 14 of the transmission is coaxially disposed with respect to the driving shaft 10 and is journaled in a needle bearing 11 and in a pair of other anti-friction bearings 12 and 13, the latter being carried by the housing 20 of the hydro-dynamic transmission and an adjoining housing 70 of a mechanical transmission adapted to be set to any one of a plurality of ratios of transmissions, for instance by the selective engagement of gears. This mechanical transmission may serve the purpose of connecting shaft 14 with the axle transmission of a motor vehicle.

A sleeve member 71 surrounding the central section of shaft 14 in spaced relationship thereto is disposed within the housing 20 and is rigidly connected therewith by suitable bolts not shown. A hollow hub member 72 is journaled within the sleeve member 71 by means of antifriction bearings 73 and 74 and carries the impeller rotor 16 of a hydro-dynamic device. The periphery of the impeller rotor 16 is rigidly connected with a substantially cylindrical casing 15 having an end wall 75 which is connected with the flange 10 for common rotation. For this purpose the end wall 75 is provided with a central boss 76 engaging an axial bore provided in the driving shaft and a peripheral rim 77 of the end wall 75 provided with teeth for the engagement of an electrical starter is connected with the flange 10 by a flexible sheet metal disk 78 which permits slight angular relative displacements between the engine and the hydraulic transmission but transmits the driving torque from the flange 10 to the impeller rotor 16.

The turbine rotor 17 surrounded by the casing 15 and disposed between the impeller 16 and the end wall 75 is formed with a hub 79 lined by a bearing sleeve 18 which is journaled on the driven shaft 14 and is slidable thereon in axial direction to the left with reference to FIG. 1.

The turbine rotor surrounds a rotor 32 which has a hub portion 80 rigidly connected with a sleeve 81 that extends through the sleeve 72 and terminates in a brake drum 82 disposed within the right-hand end of the housing 20 and cooperating with brake-shoes such as 33. Within the sleeve 81 the driven shaft 14 is surrounded by a tubular member 19 which is integral with the housing 20 and carries an anti-friction bearing 83 on which the hub portion 80 of the rotor 32 is journaled. The end of sleeve 81 remote from the anti-friction bearing 83 is carried by an anti-friction bearing 84 supported by the tubular housing member 19.

The three rotors 16, 17 and 32 of the hydro-dynamic device confine a toroidal circulation chamber and are provided with vanes for the circulation of a liquid, such as oil, in such chamber. When the brake-shoes 33 are applied to the brake drum 82 holding the rotor 32 stationary, the hydro-dynamic device acts as a torque converter in a known manner. As such torque converters are well known in the art, a more detailed description thereof is deemed dispensable herewith.

For the purposes of our invention the rotors 16 and 17 are provided with opposed clutch faces. Preferably such clutch faces are disposed on the periphery of the rotors so as to surround and adjoin the circulation chamber and extend in radial direction. The clutch faces are provided with suitable friction linings 21 and 22 and are shown in FIG. 1 in engaged condition. They may be disengaged by relative axial displacement of the two rotors 16 and 17 and, more particularly, by axial displacement of the turbine rotor 17 to the left with reference to FIGS. 1 and 2.

For the purpose of engaging the clutch faces, suitable means are coordinated to the rotors for the exertion of a force in clutch-engaging direction. In the embodiment shown in FIG. 1 such means include spring means, for instance a plurality of helical pressure springs 26 circumferentially distributed about the axis of the transmission and inserted between an annular disk 25 fixed to the turbine rotor 17 and a disk 23 disposed between the disk 25 and the end wall 75 of casing 15 and mounted for free rotation by suitable means, such as an anti-friction thrust bearing 25′ inserted between the disk 23 and the end wall 75 and a bearing sleeve inserted between a central cylindrical boss 86 and the internal periphery of the hollow boss 76. Engaging teeth 24 provided on the annular disk 25 and on the periphery of the disk 23 ensure common rotation of both. Suitable means to be described later are provided for supplying a liquid to the circulation chamber. When this chamber is filled, the liquid therein will produce a pressure upon the internal faces of the rotors 16 and 17 whereby the turbine rotor 17 will be displaced towards the end wall 75 of the casing 15, thus causing disengagement of the clutch faces 21 and 22 and compression of the springs 26. Moreover, suitable controlling means to be described later are provided for alternatively rendering either the means for supplying a liquid under pressure to the circulation chamber or the means for the exertion of a clutch-engaging force effective depending on whether a hydro-dynamic transfer or a direct mechanical transfer of the driving couple from the driving shaft to the driven shaft 14 is desired.

The annular disk 25 is fixed to a cylinder 87 which is coaxially connected with the turbine rotor 17 extending towards the casing end wall 75. Hence, the annular disk 25 may be considered part of the turbine rotor. A piston member 27 is axially movable in the cylinder 87 and a plurality of circumferentially distributed springs 28 are inserted between the piston member 27 and the disk 89 which connects the peripheral portion of the rotor 17 with the hub portion 79 thereof. A clutch disk 29 provided with friction linings 30 and 31 is inserted between opposed plane faces of the disk 25 and the piston member 27 and has a hub portion 88 non-rotatably secured to the driving shaft 14. Under normal operating conditions the helical pressure springs 28 are operative to firmly clamp the clutch disk 29 and the linings 30 and 31 thereof between the opposed faces of the annular disk 25 and of the piston member 27 whereby the driven shaft 14 is firmly clutched to the turbine rotor.

When the clutch 21, 22 is disengaged, the gap between the clutch faces establishes a communication between the circulation chamber confined by the rotors 16, 17 and 32 and the space left between the turbine rotors 17, 87, 25 and the rotary casings 15, 75. This space receives the liquid discharged from the circulation chamber through the gap between the rotors 16 and 17 and, therefore, will be termed "discharge space" hereinafter and in the claims. This discharge space communicates through a plurality of apertures 40 with the end of the cylinder 87. Hence, if pressure of a sufficient magnitude is built up in the discharge space, the piston member 27 will be urged towards the disk 89 of the turbine rotor, whereby the clutch disk 29 will be released to permit the shaft 14 rotation independent of that of the turbine rotor 17. This is desirable, for instance, whenever the ratio of transmission in the transmission 70 must be changed.

Suitable conduit means are provided for supplying the liquid to the circulation chamber, such conduit means including a pipe 34 communicating with a chamber confined in the housing 20 by the sleeve member 71, and the annular space 35 left between the sleeves 72 and 81. When during the hydro-dynamic operation of the transmission the clutch linings 21 and 22 are spaced apart, the liquid discharged from the circulation chamber into the discharge space 36 will flow from the latter to a pipe 39 via the space between the disks 23 and 25, holes 90 provided in the clutch disk 29, bores 37 provided in the hub portion 79, the annular gap 38 between the driven shaft 14 and the tubular housing member 19, bores 91 and a chamber 92 provided in the housing 20 adjacent the housing 70 by a partition 93 of the housing.

Suitable means are provided for subjecting the end face of piston member 27 engaged by the springs 28 to atmospheric pressure, such means in the embodiments illustrated comprising bores 42 of the hub portion 79 of the turbine rotor communicating with an internal peripheral groove of such hub portion and a longitudinal bore 43 provided in the tubular housing member 19 and in the partition 93, such bore having a vent 44 communicating with the atmosphere.

The embodiment illustrated in FIG. 2 differs from the embodiment described hereinabove by the omission of the springs 26 and of the disk 23. This embodiment relies solely on fluid pressure in the discharge space 36 for the engagement of the clutch linings 21 and 22, whereas in FIG. 1 such fluid pressure in space 36 is aided by the springs 26.

The controlling means for the control of the conduit means for supplying the liquid to the circulation chamber will now be described with reference to FIG. 3.

The sleeve 72 connected with the impeller rotor 16 carries a gear 94 fixed thereto which operates a gear pump 45 having a suction port communicating through a pipe 95 with a reservoir disposed in the bottom of housing 20 and containing a suitable liquid, such as oil, whereas the pressure port of the pump 45 communicates with a pressure pipe 46 leading to a valve housing 96 diagrammatically shown in FIG. 3 in section. A piston slide valve 47 is mounted in a bore 64 of the valve housing 96 for axial displacement so as to be movable between two positions M and H. The slidable valve member 47 is provided with spaced peripheral grooves 97 and 98. When the valve assumes the H-position illustrated in FIG. 3, the groove 98 establishes a communication between a bore 99 communicating with the pipe 46 and a port communicating with the pipe 34 shown in FIG. 1 and communicating with the circulation chamber. The groove 97 establishes a communication between a port connected to the pipe 39 and a duct 50 which in its turn communicates with discharge duct 54. The communication between the ducts 50 and 54 is controlled by a relief valve formed by a slidable piston 52 subjected to the force of a pressure spring 60. Therefore, the fluid discharged into the discharge space 36 will be maintained under a pressure sufficient to depress the piston 52 contrary to the force of the spring 56. This pressure is insufficient to cause engagement of the clutch faces 21 and 22 of the rotors 16 and 17. Therefore, when the slide valve 47 is shifted to the H-position fluid under pressure will be supplied to the circulation chamber of the hydrodynamic device and will be circulated by the vanes of the impeller rotor 16 through the vanes of the rotor 32 and of the turbine rotor 17 transferring the torque of the driving shaft to the turbine rotor 17 which is connected with the driven shaft 14 for common rotation by the engaged clutch 29.

For the purpose of engaging the clutch faces 21 and 22 for mechanical transfer of the driving torque from the driving shaft to the driven shaft 14 the slide valve is moved to the M-position. As a result, the communication between the pipe 39 and the duct 50 is closed, communication is established between a branch 100 of duct 99 and a duct 48 communicating with the pipe 39 and communication is also established between the discharge conduit 49 and a conduit 101 communicating with the pipe 34, while the communication between the latter and the duct 99 is closed. Therefore, the circulation chamber is now relieved from pressure, whereas the full pressure produced by the pump 45 is communicated to the discharge space 36 and acting upon the disk 25 of the turbine rotor 17 urges the same towards the right with reference to FIGS. 1 and 2 thereby engaging the clutch linings 21 and 22 closing the gap therebetween. As a result, the driving torque will now be transmitted mechanically from the driving shaft through the impeller 16, the turbine rotor 17 and the clutch 29 to the driven shaft 14.

For the purpose of disengaging the clutch 29 the pressure in the space 36 must be increased beyond the magnitude prevailing during the normal hydrostatic operation of the transmission. Hence, it will appear that the control valve 47 is operative in the H-position to connect the source 45 of liquid under pressure with the conduit means 34, 35 for supplying the liquid to the circulation chamber and operative in the M-position to connect the source 45 of liquid under pressure with the means 36 coordinated to the rotors 16, 17 for the exertion of a force in clutch-engaging direction.

For the purpose of disengaging the clutch 29 conduit control means are provided for building up fluid pressure in the discharge space 36 and in the fluid chamber 41 provided between the disk 25 and the piston member 27 communicating with the discharge space 36 through the apertures 40. These conduit control means will now be described. The relief valve 52 is integral with a piston 102 of larger diameter movable in a bore 60 of the valve housing 96. The spring 56 which imposes a load on the relief valve 52 is inserted in this bore 60. The piston 102 may be subjected to fluid pressure to thereby increase such load. When that happens, the pressure maintained in the discharge space 36 and the duct 50 will be increased considerably beyond the pressure prevailing during the mechanical power transmission through clutch 21, 22 and, as a result, this fluid pressure will cause displacement of the piston member 27 contrary to the tendency of the springs 28, whereby the clutch 29, 30, 31 will be disengaged.

For the purpose of suppling liquid under pressure to the bore 60 the pipe 46 has a branch 58 communicating with a duct 103 of the valve housing 96. A piston valve 59 slidable in a bore 104 between two positions E and A has a groove 105 which in the E-position establishes a communication between a discharge port 106 and a duct 107 which in its turn communicates with a duct 108 leading to the bore 60. Therefore, when the valve 59 is set to the E-position no fluid pressure will act on the piston 102 and the spring-loaded relief valve 52 is loaded by its spring only. When the valve 59 is shifted to the A-position, however, its groove 105 establishes a communication between the pressure duct 103 and the duct 107 so that liquid under pressure will pass into the bore 60 and increase the load of the relief valve 52.

Preferably, the duct 108 communicates with an auxiliary pressure relief valve in form of a slidable piston valve 62 mounted in a bore 109 that intersects the duct 107 and accommodates a pressure spring 57 tending to hold the slidable valve member 62 in the position in which a peripheral groove thereof establishes the communication between the ducts 107 and 108. The inner end of the bore 109 communicates through a duct 110 and a duct 111 with the bore 60. Therefore, the pressure prevailing in the bore 60 acts on the end face of the valve member 62 and when it exceeds a certain limit will shift the valve member 62 contrary to the tendency of its spring 57 to the left with reference to FIG. 3 until the peripheral groove of the valve member 62 establishes a communication between a discharge conduit 112 provided in housing 96 and a branch of the duct 108, thus relieving this duct and the bore 60 from the excessive pressure. Hence, it will appear that the slidable piston valve 59 constitutes a means for optionally increasing the load of the relief valve 52.

If desired, a second pressure relief valve 53 may be coordinated to the pump 45 to limit the pressure produced in the duct 99. To this end a branch 51 of the duct 99 and a discharge duct 55 provided in the housing 96 may be put into communication by the relief piston valve 53. For the purpose of increasing the pressure in line 99 when the clutch 29 is to be disengaged, the means 59 for optionally increasing the load of the spring-loaded relief valve 52 may be operative at the same time to increase the load of the pressure relief valve 53. To this end, a piston 113 is integral with the piston valve member 53 but has a larger diameter and is movable in a bore 61 of the housing 96 which communicates with the duct 111 and includes the loading spring 57.

The operation of our novel transmission will be briefly reiterated hereinafter:

For the hydro-dynamic operation of the transmission the slide valve 47 is set to the H-position and the valve 59 is set to the E-position. The liquid under pressure will flow through the pressure pipe 46, the pressure duct 99 and the pipe 34 to the circulation chamber of the hydro-dynamic device and will effect the hydro-dynamic transfer of the driving torque from the impeller rotor to the turbine rotor. The pressure prevailing in the circulation chamber will move the two rotors 16 and 17 slightly apart so that the liquid can be discharged through the gap between the clutch linings 21 and 22 into the discharge space 36 of the hydro-dynamic device. From this discharge space it will be discharged through the pipe 39 and the ducts 50 and 54 back to the reservoir. When the driver of the vehicle wishes to change the ratio of transmission set up in the transmission 70, the clutch 29 must be disengaged to permit free rotation of the driven shaft 14. For this purpose the slide valve 59 will be set to the A-position. As a result, liquid under pressure will be supplied from the pump 45 through the pipe 46, the branch pipe 58 and the ducts 103, 107 and 108 to the bore 60. As a result, the load imposed on the relief valve 52 is increased, thereby increasing the pressure prevailing in the duct 50. This increase of pressure reacts on the pressure prevailing in the pressure pipe 46 and this pressure increase is fed back again into the pipe 58, thereby further increasing the pressure prevailing in the space 60, whereby the pressure in duct 50 will be again increased. The repeated feed back of the pressure increase will be terminated when the pressure prevailing in the bore 60 opens the auxiliary pressure relief valve 62 in the manner described hereinabove. When that happens, the pressure prevailing in the duct 50 and in the discharge space 36 has increased to such a magnitude as to be able to overcome the springs 28 and to move the piston member 27 towards the right, whereby the clutch 29 will be disengaged.

When a mechanical transfer of the torque by the transmission is desired, the slide valve 47 is set to the M-position. As a result, the liquid will flow from the pump 45 through the pipe 46, the pressure duct 99, the branch 100, the duct 48 and the pipe 39 into the discharge space 36 and set up a pressure therein which will urge the turbine rotor 17 against the impeller rotor 16, since the circulation chamber of the hydro-dynamic device is relieved from pressure through the pipe 34, the duct 101, the groove 98 and the discharge conduit 49. When it is desired under this condition to disengage the clutch 29, the slide valve 59 is again set to the A-position, whereby the pressure prevailing in the bore 61 will be considerably increased. Hence, the relief valve 53 increases the pressure in the ducts 51, 99, 100 and 48 and in the discharge space 36 and this increase is again fed back through the branch pipe 58 and the ducts 103, 107, 108 and 111 into the bore 61, until the auxiliary pressure relief valve 62 responds and prevents a further pressure increase. When that happens the pressure in the space 36 is sufficient to cause disengagement of the clutch 29.

Preferably restoring means are provided which are controlled by the means 59 for optionally increasing the load of the spring-loaded relief valve 52. Such restoring means are connected with the control valve 47 for restoring the same into the H-position, when the fluid pressure in the discharge space 36 is increased to the point of causing disengagement of the friction clutch 29. In the embodiment shown the restoring means is composed of cylinder and piston. Preferably, the piston 114 is integral with the slidable valve member 47 and, in fact, may be formed by an end section thereof and the cylinder is constituted by the bore 64. A duct 63 connects the bore 60 with the cylinder 64.

When it is desired to disengage the clutch 29 by displacement of the valve member 59 to the A-position, while the control valve 47 is set to the M-position, the control valve member 47 must be detained in its M-position by suitable locking means not shown for the purpose of preventing its restoration into the H-position by the high pressure set up in the bores 60, 61 and 64 by the effect of the auxiliary valve 59. When the control valve 47 is not locked, it will automatically be restored to the H-position for hydro-dynamic operation as soon as the disengagement of the clutch 29 has been initiated by displacement of the auxiliary valve 59 to the A-position. This has the effect of ensuring that whenever the clutch 29 is re-engaged, the torque will be transmitted hydro-dynamically, i.e. in a very smooth manner.

The embodiment illustrated in FIG. 2 requires that the pressure set up in the discharge space 36 with the control valve 47 in the M-position is sufficiently high to safely engage the clutch 21, 22, since in this embodiment such pressure is not aided by any springs, such as springs 26 shown in FIG. 1.

From the foregoing it will appear that our invention relates to a hydro-dynamic-mechanical transmission, particularly a transmission including a hydro-dynamic device having a guide vane rotor, such as rotor 32, adapted to be arrested either arbitrarily or by a free-wheeling clutch, means being provided for mechanically by-passing the hydro-dynamic device by means of a clutch, such as clutch 21, 22. According to our invention, the impeller rotor and the turbine rotor of the hydro-dynamic device are relatively movable in axial direction and, in mechanical operation, are urged against each other by a suitable force, preferably the force of springs and/or fluid pressure for the purpose of being clutched mechanically with each other, whereas in the hydro-dynamic operation the fluid pressure of the liquid in the circulation chamber is operative to move the two rotors apart and, if necessary, to overcome the coupling force just referred to. In this manner the operator may easily switch over from the hydro-dynamic operation to the mechanical operation and vice versa without the necessity of the provision of an additional circulation of a pressure fluid and substantially with the aid of the elements and pressure spaces existing in the transmission.

Regarding the disposition of the clutching faces for mechanically clutching the impeller rotor with the turbine rotor, we prefer to dispose the clutching faces on the outer periphery of the rotors so as to extend radially adjoining the circulation chamber of the hydro-dynamic device.

A particularly compact organization of the various elements will result by the connection of the rotor held by its bearings against axial displacement, preferably the impeller rotor, with a rotary casing including the axially movable rotor, preferably the turbine rotor, and including springs which are inserted between the axially movable rotor and the casing or between the axially movable rotor and elements held by their bearings against axial displacement. In a transmission of the type in which the rotary casing enclosing the movable turbine rotor extends between the driving shaft and the impeller rotor, the springs may be so disposed as to be braced on that side of the turbine rotor which is opposite to the turbine vanes and on the other side the springs may be braced against a disk disposed within the casing and rotatably mounted in the housing by means of a thrust bearing, such as bearing 25'.

Moreover we use the circulation of the pressure fluid required at any rate for the hydro-dynamic operation in a simple manner at the same time for the mechanical operation by the provision of a control element, such as valve 47 which when set to the H-position for the hydro-dynamic operation, directs the liquid under pressure to the interior circulation chamber of the hydro-dynamic device and, when set to the M-position for the mechanical power transfer directs the liquid under pressure to the outer discharge space of the hydro-dynamic device to thereby urge the impeller rotor and the turbine rotor against each other, if desired assisted by suitable springs. The arrangement may be so provided that the control element formed by a slidable valve, such as valve 47, in its H-position for the hydro-dynamic operation opens an outlet to the liquid passing from the circulation chamber into the outer discharge space and, in the M-position for mechanical power transfer, connects the circulation space with a discharge conduit.

More particularly, where a mechanical transmission, such as transmission 70 is preceded by our novel hydrodynamic transmission, we prefer for the purpose of fully releasing the shaft 14 during the change of the ratio of transmission, to provide a disengageable clutch, whereby the shaft 14 may be disengaged from at least one of the rotors, preferably the turbine rotor. This clutch, such as clutch 29, 30 and 31, may be engaged by spring means and may be disengaged by fluid pressure. For this purpose we prefer to establish a communication of the fluid chamber, such as chamber 41 of the clutch, with the outer discharge space of the hydro-dynamic device, such as the discharge space 36, and to provide means for building up increased fluid pressure in these spaces for the purpose of disengaging the clutch. In this manner the disengageable clutch is actuated without requiring the provision of an additional circulation of a pressure fluid, the disengagement being effected by the existing circulation required for the hydro-dynamic operation of the transmission. More specifically, provision may be made for constructing the rotor co-operating with the clutch, preferably the turbine rotor, on its side opposite to its vanes as a cylinder in which a piston member is axially slidable, one face being subject to atmospheric pressure and serving as a bearing face for the pressure springs inserted between the piston member and the housing, the other face of the piston member being acted upon by the liquid under pressure, the piston member acting on the disengageable clutch having a clutch member mounted for common rotation on the driven shaft.

A simple possibility of actuating the clutch, such as clutch 29, 30 and 31, during the hydro-dynamic operation results from the communication of the clutch-actuating fluid chamber, such as chamber 41, through the discharge space and the gap of the clutch faces of the rotors with the circulation chamber, provided that suitable means, such as a relief valve, is disposed in the outlet conduit of the discharge space of the hydro-dynamic device for the purpose of increasing the pressure prevailing in such discharge space and in the fluid chamber, such as chamber 41, such pressure increase being sufficient to disengage the clutch.

When it is desired to disengage the clutch, such as clutch 29, 30, 31 during the mechanical operation of the transmission, we prefer the provision of suitable means, such as the pressure relief valve 53, communicating with the pressure fluid conduit effective during hydro-dynamic operation to connect the source of fluid pressure with the discharge space for the purpose of increasing the pressure therein to a degree sufficient to cause disengagement of the clutch.

The relief valves may be set up to a higher pressure by an arbitrary increase of their load, for instance by actuation of an auxiliary valve controlling the admission of a fluid under pressure supplied by the pump, an auxiliary pressure relief valve being preferably provided for limiting the pressure of the fluid increasing the load of the relief valve.

In order to ensure a smooth engagement of the clutch we prefer to provide the restoring means, such as 64, 114, whereby the hydro-dynamic function of the transmission will be put in operation, when the clutch is actuated.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a transmission, the combination comprising a driving shaft, a driven shaft, a hydrodynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, said last named means comprising a member carried by one of said rotors extending transversely of the axis thereof and further comprising a plurality of spaced springs disposed circularly about said axis and engaging said member and unitary controlling means for alternatively rendering one or the other of said means effective.

2. In a transmission, the combination comprising a driving shaft, a driven shaft, a hydrodynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid under pressure to said circulation chamber, one of said rotors with one of said opposed clutch faces being displaced axially in response to said pressure in said circulation chamber in a direction away from the other of said rotors and the other of said opposed clutch faces, means coordinated to said rotors for the exertion of a force in clutch-engaging direction thereon, and unitary controlling means for alternatively rendering one or the other of said means effective, said means coordinated to said rotors for the exertion of a force in clutch-engaging direction thereon being formed by spring means.

3. The combination claimed in claim 1, in which said means coordinated to said rotors for the exertion of a force in clutch-engaging direction thereon is operable by fluid pressure, said springs being compressed when said first-named means is rendered effective.

4. The combination claimed in claim 1, in which the other of said rotors is provided with a flange extending radially of said driven shaft and said clutch faces are disposed on said member and on said flange.

5. In a transmission, the combination comprising a driving shaft, a driven shaft, a hydrodynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid under pressure to said circulation chamber, one of said rotors with one of said opposed clutch faces being displaced axially in response to said pressure in said circulation chamber in a direction away from the other of said rotors and the other of said opposed clutch faces, means coordinated to said rotors for the exertion of a force in clutch-engaging direction thereon, and unitary controlling means for alternatively rendering one or the other of said means effective, one of said rotors being rigidly connected with a casing, said one of said rotors and said casing surrounding the other one of said rotors, said second-mentioned means including a spring means mounted in said casing and bearing against said last-mentioned rotor.

6. In a transmission, the combination comprising a driving shaft, a driven shaft, a hydrodynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid under pressure to said circulation chamber, one of said rotors with one of said opposed clutch faces being displaced axially in response to said pressure in said circulation chamber in a direction away from the other of said rotors and the other of said opposed clutch faces, means coordinated to said rotors for the exertion of a force in clutch-engaging direction thereon, and unitary controlling means for alternatively rendering one or the other of said means effective, one of said rotors being rigidly connected with a casing, said one of said rotors and said casing surrounding the other one of said rotors, said second-mentioned means including a spring means mounted in said casing and bearing against said last-mentioned rotor, said rotor being surrounded by said one of said rotors and said casing being the turbine rotor.

7. In a transmission the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, a casing rigidly connected with said impeller rotor and partially surrounding said turbine rotor, the latter being mounted for axial displacement within said casing, springs mounted in said casing in engagement with said turbine rotor and tending to bring said clutch faces into engagement, conduit means for supplying a liquid to said circulation chamber in which said liquid produces a clutch-disengaging pressure overcoming the tendency of said springs and controlling means for the control of said conduit means.

8. The combination claimed in claim 7 further comprising a disk disposed within said casing adjacent to said turbine rotor and mounted for coaxial rotation relative to said casing, said springs being inserted between and bearing against said turbine rotor and said disk.

9. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means comprising a plurality of resilient members and coordinated to said rotors for the exertion of a force in clutch-engaging direction thereof, and unitary controlling means for alternatively rendering one or the other of said means effective, said means comprising a plurality of resilient members and coordinated to said rotors for the exertion of a force in clutch-engaging direction thereon being operable by fluid pressure, said unitary controlling means comprising a grooved cylindrical control valve movable in the direction of its length between two positions and operative in one position to connect a source of liquid under pressure with said means for supplying a liquid to said circulation chamber and operative in the other position to connect said source of liquid under pressure with said means comprising a plurality of resilient members coordinated to said rotors for the exertion of a force in clutch-engaging direction.

10. The combination claimed in claim 9 further comprising a discharge conduit and a relief valve, said hydrodynamic device including a discharge space communicating with the periphery of said circulation chamber, said control valve being operative in said one position to connect said discharge space with said relief valve and being operative in said other position to connect said circulation chamber with said discharge conduit.

11. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and controlling means for alternatively rendering one or the other of said means effective, said combination further comprising a friction clutch connecting one of said rotors with the associated one of said shafts, spring means coordinated to said clutch and tending to keep same in engaged condition, fluid-operable means connected with said clutch for disengaging the same contrary to the tendency of said spring means and including a fluid chamber, said hydro-dynamic device including a discharge space communicating with the periphery of said chamber and with said fluid chamber, and conduit control means for building up fluid pressure in said discharge space and said fluid chamber causing disengagement of said friction clutch, when said controlling means render said means for supplying a liquid effective.

12. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and controlling means for alternatively rendering one or the other of said means effective, said combination further comprising a cylinder coaxially connected with said turbine rotor, a piston member axially movable in said cylinder, conduit means for subjecting one end face of said cylinder to atmospheric pressure, springs inserted between said end face and said turbine rotor, means for subjecting the other end face of said piston member to fluid pressure, and a friction clutch connecting said turbine rotor with said driven shaft and being coordinated to said piston for engagement by action of said springs and for disengagement by action of said fluid pressure.

13. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and controlling means for alternatively rendering one or the other of said means effective, said combination further comprising a cylinder coaxially connected with said turbine rotor, a piston member axially movable in said cylinder, conduit means for subjecting one end face of said cylinder to atmospheric pressure, springs inserted between said end face and said turbine rotor, means for subjecting the other end face of said piston member to fluid pressure, and a friction clutch connecting said turbine rotor with said driven shaft and being coordinated to said piston for engagement by action of said springs and for disengagement by action of said fluid pressure, said hydro-dynamic device including a discharge space communicating with the periphery of said circulation chamber and with said cylinder, said means for subjecting the other end face of said piston to fluid pressure including a relief valve for building up pressure in said discharge space and in said cylinder when said controlling means render said means for supplying a liquid effective.

14. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and controlling means for alternatively rendering one or the other of said means effective, said hydro-dynamic device including a discharge space communicating with the periphery of said circulation chamber, said combination further comprising a cylinder coaxially connected with said turbine rotor, a piston member axially movable in said cylinder, conduit means for subjecting one end face of said cylinder to atmospheric pressure, springs inserted between said end face and said turbine rotor, means for subjecting the other end face of said piston member to fluid pressure including a spring-loaded relief valve and means for optionally increasing the load thereof, a friction clutch connecting said turbine rotor with said driven shaft and being coordinated to said piston for engagement by action of said springs and for disengagement by action of said fluid pressure, a discharge port, and a control valve movable between two positions and operative in one position to connect a source of liquid under pressure with said means for supplying a liquid to said circulation chamber and to connect said discharge space with said relief valve and being operative in the other position to connect said source of liquid under pressure with said discharge space and to connect said circulation chamber with said discharge port.

15. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and controlling means for alternatively rendering one or the other of said means effective, said hydro-dynamic device including a discharge space communicating with the periphery of said circulation chamber, said combination further comprising a cylinder coaxially connected with said turbine rotor, a piston member axially movable in said cylinder, conduit means for subjecting one end face of said cylinder to atmospheric pressure, springs inserted between said end face and said turbine rotor, means for subjecting the other end face of said piston member to fluid pressure including a spring-loaded relief valve and means for optionally increasing the load thereof, a friction clutch connecting said turbine rotor with said driven shaft and being coordinated to said piston for engagement by action of said springs and for disengagement by action of said fluid pressure, a discharge port, and a control valve movable between two positions and operative in one position to connect a source of liquid under pressure with said means for supplying a liquid to said circulation chamber and to connect said discharge space with said relief valve and being operative in the other position to connect said source of liquid under pressure with said discharge space and to connect said circulation chamber with said discharge port, a pump constituting said source of liquid under pressure, a pressure relief valve coordinated to said pump, said means for optionally increasing the load of said spring-loaded relief valve being operative at the same time to increase the load of said pressure relief valve for increasing the pressure produced by said pump to a magnitude sufficient to cause said disengagement.

16. The combination claimed in claim 15, in which said means for optionally increasing the load comprises fluid-operable pistons connected with said relief valves, a duct for supplying liquid under pressure from said pump to said pistons, and an auxiliary valve controlling said duct.

17. The combination claimed in claim 15, in which said means for optionally increasing the load comprises fluid-operable pistons connected with said relief valves, a duct for supplying liquid under pressure from said pump to said pistons, an auxiliary valve controlling said duct, and an auxiliary pressure relief valve communicating with said duct between said auxiliary valve and said relief valves.

18. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and unitary controlling means for alternatively rendering one or the other of said means effective, said hydro-dynamic device including a discharge space communicating with the periphery of said circulation chamber, said combination further comprising a cylinder coaxially connected with said turbine rotor, a piston member axially movable in said cylinder, conduit means for subjecting one end face of said cylinder to atmospheric pressure, springs inserted between said end face and said turbine rotor, means for subjecting the other end face of said piston member to fluid pressure including a spring-loaded relief valve and means for optionally increasing the load thereof, a friction clutch connecting said turbine rotor with said driven shaft and being coordinated to said piston for engagement by action of said springs and for disengagement by action of said fluid pressure, a discharge port, a control valve movable between two positions and operative in one position to connect a source of liquid under pressure with said means for supplying a liquid to said circulation chamber and to connect said discharge space with said relief valve and being operative in the other position to connect said source of liquid under pressure with said discharge space and to connect said circulation chamber with said discharge port, and restoring means controlled by said means for optionally increasing the load of said spring-loaded relief valve and connected with said control valve for restoring same into said one position, when said other end face of said piston member is subjected to a fluid pressure causing said disengagement of said friction clutch.

19. In a transmission, the combination comprising a driving shaft, a driven shaft, a hydro-dynamic device including an impeller rotor connected with said driving shaft and a turbine rotor connected with said driven shaft, said rotors cooperating to confine a circulation chamber for circulation of liquid and being provided with opposed clutch faces, bearings for mounting said rotors for relative axial displacement and for consequent engagement and disengagement of said clutch faces, means for supplying a liquid to said circulation chamber in which said liquid produces a clutch-disengaging pressure, means coordinated to said rotors for the exertion of a force in clutch-engaging direction thereon, and unitary controlling means for alternatively rendering one or the other of said means effective, said hydro-dynamic device including a discharge space communicating with the periphery of said circulation chamber, said combination further comprising a cylinder coaxially connected with said turbine rotor, a piston member axially movable in said cylinder, conduit means for subjecting one end face of said cylinder to atmospheric pressure, springs inserted inserted between said end face and said turbine rotor, means for subjecting the other end face of said piston member to fluid pressure including a spring-loaded relief valve and means for optionally increasing the load thereof, a friction clutch connecting said turbine rotor with said driven shaft and being coordinated to said piston for engagement by action of said springs and for disengagement by action of said fluid pressure, a discharge port, a control valve movable between two positions and operative in one position to connect a source of liquid under pressure with said means for supplying a liquid to said circulation chamber and to connect said discharge space with said relief valve and being operative in the other position to connect said source of liquid under pressure with said discharge space and to connect said circulation chamber with said discharge port, and restoring means controlled by said means for optionally increasing the load of said spring-loaded relief valve and connected with said control valve for restoring same into said one position, when said other end face of said piston member is subjected to a fluid pressure causing said disengagement of said friction clutch, said restoring means being composed of cylinder and piston means, said means for optionally increasing the load comprising a fluid-operable piston connected with said relief valve, duct means for supplying liquid under pressure from said pump to said last-mentioned piston and to said restoring means, and an auxiliary valve controlling said duct means.

References Cited in the file of this patent
UNITED STATES PATENTS

| | | |
|---|---|---|
| 2,130,895 | Ness | Sept. 20, 1938 |
| 2,731,119 | Burdett et al. | Jan. 17, 1956 |
| 2,860,747 | Kelley | Nov. 18, 1958 |